United States Patent [19]
Chu et al.

[11] Patent Number: 5,651,080
[45] Date of Patent: Jul. 22, 1997

[54] OPTICAL EXCHANGING APPARATUS USING MODE CONVERSION AND MODE SELECTION IN AN OPTICAL WAVEGUIDE

[75] Inventors: Kwang Uk Chu; Yong Hyub Won, both of Daejeon, Rep. of Korea

[73] Assignees: Electronics and Telecommunications Research Institute, Daejeon; Korea Telecommunication Authority, Seoul, both of Rep. of Korea

[21] Appl. No.: 707,305

[22] Filed: Sep. 3, 1996

[30] Foreign Application Priority Data

Nov. 2, 1995 [KR] Rep. of Korea ............ 95-39429

[51] Int. Cl.$^6$ ...................................... G02B 6/28
[52] U.S. Cl. ............... 385/28; 385/24; 385/31; 359/116; 359/154
[58] Field of Search ............... 385/28, 20, 21, 385/24, 27, 31, 39; 359/116, 154, 159, 180, 189

[56] References Cited

U.S. PATENT DOCUMENTS 5,325,221  6/1994  Van der Tol ............ 359/116
5,555,326  9/1996  Hwang et al. ............ 385/28 X

*Primary Examiner*—Phan T. H. Palmer
*Attorney, Agent, or Firm*—Nixon & Vanderhye P.C.

[57] ABSTRACT

An optical exchanging apparatus is disclosed including N optical transmitters for generating optical signals each having a single constant mode, N mode converters for converting modes of the optical signals generated from the optical transmitters according to a mode-converting signal, an Nx1 coupler for coupling the mode-converted optical signals generated from the mode converters to be supplied to one terminal, a 1xN distributor or distributing the coupled optical signal generated from the Nx1 coupler to N optical signals each having various modes, N mode selectors for respectively passing only the optical signal of a selected mode out of the N optical signals generated from the 1xN distributor, and N optical receivers for receiving the optical signals generated from the mode selectors.

2 Claims, 5 Drawing Sheets

OPTICAL EXCHANGING APPARATUS USING MODE CONVERSION AND MODE SELECTION IN AN OPTICAL WAVEGUIDE

BACKGROUND OF THE INVENTION

The present invention relates to an improved optical exchanging system, and more particularly to an optical exchanging apparatus using mode conversion and mode selection in an optical waveguide.

Recently, in order to overcome limitations of the capacity of a conventional electronic exchange, studies on an optical exchanging system are making active progress. As a result, there have been proposed an optical space division multiplexing system using an optical linear property, an optical time division multiplexing system using an optical high-speed property, an optical wavelength division multiplexing system using incoherence between optical wavelengths, an optical code division multiplexing system using optical signal processing, etc.

SUMMARY OF THE INVENTION

It is an object of the present invention to provide an optical exchanging apparatus using mode conversion and mode selection in an optical waveguide.

In accordance with one aspect of the present invention, an optical exchanging apparatus includes N optical transmitters for generating optical signals each having a single constant mode, N mode converters for converting modes of the optical signals generated from the optical transmitters according to a mode converting signal, an Nx1 coupler for coupling the mode-converted optical signals generated from the mode converters to be supplied to one terminal, a 1xN distributor for distributing the coupled optical signal generated from the Nx1 coupler to N optical signals each having various modes, N mode selectors for respectively passing only the optical signal of a selected mode out of the N optical signals generated from the 1xN distributor, and N optical receivers for receiving the optical signals generated from the mode selectors.

In accordance with another aspect of the present invention, an optical exchanging apparatus includes N optical transmitters for generating optical signals each having a single constant mode, N first mode converters for converting modes of the optical signals generated from the optical transmitters to fixed modes, an Nx1 coupler for coupling the mode-converted optical signals generated from the first mode converters to be supplied to one terminal, a 1xN distributor for distributing one coupled optical signal generated from the Nx1 coupler to N optical signals, N second mode converters for converting modes of the optical signals generated from the 1xN distributor according to a mode converting signal, N mode selectors for respectively passing only the optical signal of a selected mode out of the mode-converted optical signals each having various modes generated from the second mode converters, and N optical receivers for receiving the optical signals generated from the mode selectors.

BRIEF DESCRIPTION OF THE ATTACHED DRAWINGS

DETAILED DESCRIPTION OF PREFERRED EMBODIMENT

First, features of a mode converter, an Nx1 coupler, a 1xN distributor, a mode selector, etc. will be defined prior to a description of a unfolded NxN optical exchanging apparatus according to the present invention. To gain a better understanding of mode conversion and mode selection in an optical waveguide, an example of the mode conversion and the mode selection in an optical fiber will be described.

An optical waveguide is the structure of an optical device which is artificially designed so as that a light goes to a uniform path without dispersing. The type and the number of modes at which the light can proceed within the optical waveguide are determined by the structure of the optical waveguide. In an optical fiber with a cylinder-shaped optical waveguide, the structure of the optical waveguide is determined by a V-number. The V-number is defined by an equation related to the size of an optical fiber core, a difference of an refractive index between a core and a cladding, an optical wavelength, etc. Thus, the type of and the number of modes, and a traveling constant are determined by this V-number. If the V-number increases, the mode at which the light can travel increases in order of LP01, LP11, LP21, etc. For example, if the V-number is less than 2.405, there is only a traveling mode LP01. If the V-number is greater than 2.405 and less than 3.832, there are traveling modes LP01 and LP11. The optical fiber is often distinguished by the number of traveling modes. There are a single mode optical fiber having the lowest traveling mode LP01, a double mode optical fiber having two traveling modes LP01 and LP11, a multimode optical fiber having a plurality of traveling modes, and the like.

When the light travels, if there are no structural variations in the optical waveguide, the light maintains its mode. However, if there are structural variations in the optical waveguide, the mode of the light changes to another mode. This phenomenon is called a "coupling between modes", and a changing efficiency is a "coupling ratio". When only an optical signal of the lowest mode LP01 travels in the double mode optical fiber, its mode may be coupled to the mode LP11 by bending the optical fiber at regular intervals. If the coupling ratio is 100%, the mode conversion from LP01 to LP11 occurs. Contrarily, if only the optical signal of the mode LP11 travels in the double mode optical fiber, the conversion to the mode LP01 may occur. The mode conversion of the optical signal can be controlled by adjusting a physical influence on the optical waveguide. The converted ratio is also adjustable. The mode conversion is applied to the multimode optical fiber.

Figure 1A:
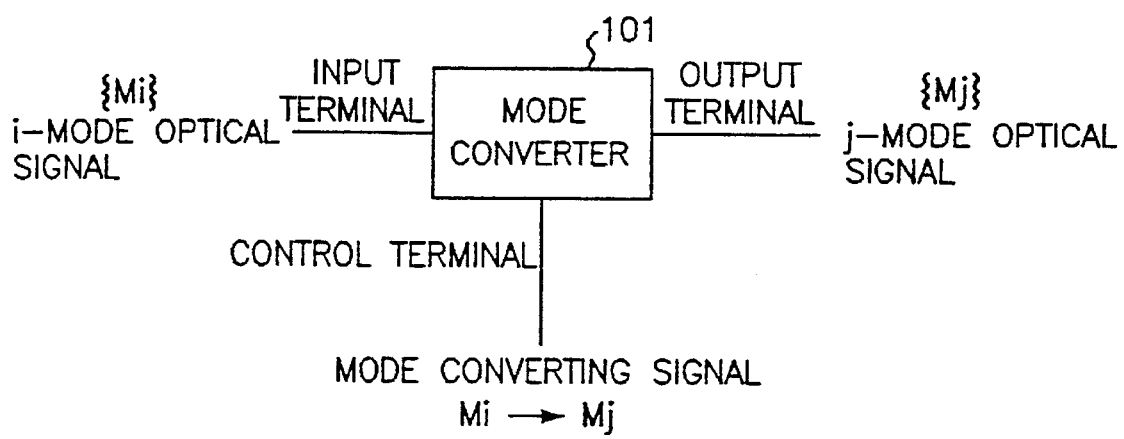
FIGS. 1A and 1B are block diagrams of mode converters according to the present invention.
Figure 1B:
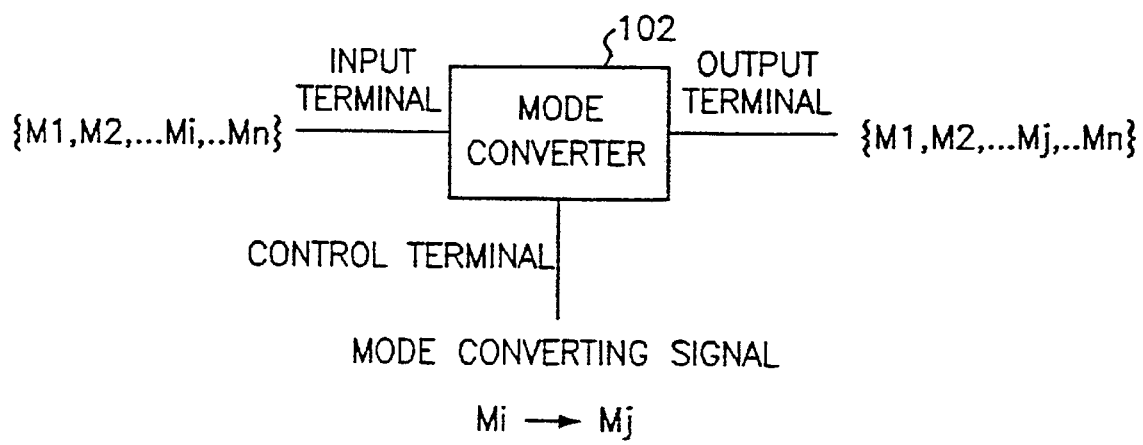

Referring to FIGS. 1A and 1B, there are shown mode converters 101 and 102. The mode converters 101 and 102 respectively control the mode conversion of the optical signal by a mode-converting signal of a control terminal. If there is no the mode converting signal, the optical signal is passed without the mode conversion. If the optical signals of various modes are mixed, only the mode suitable for the mode-converting signal is converted, and the optical signals of other modes are passed.

In FIG. 1A, an i-mode optical signal {Mi} is converted to a j-mode optical signal {Mj} by a mode-converting signal Mi→Mj (where, '{}' indicates an optical signal, and a character in braces { } represents a mode of the optical signal. If there are a variety of character sets, they indicate that the optical signals of various modes are coupled). If i equals to j, there is no the mode converting signal.

In FIG. 1B, only the optical signal {Mi} is converted to {Mj} by the mode converting signal Mi→Mj among optical signals {M1, M2, . . . , Mi, . . . , MN} having N modes.

The coupling is generated between optical waveguides as well as between modes. If two optical waveguides are joined closely to each other, the optical signal traveling toward either one of the optical waveguides is coupled to the other waveguide, and a portion of the optical signals is moved to the other waveguide. This is called 'directional coupling'. The coupling ratio can be adjusted by varying an interval of the optical waveguide. Two optical signals supplied to two optical waveguides can be coupled to one optical waveguide using the directional coupling, and the mode of each optical signal may be not varied. These functions are provided by a 2X1 coupler. To increase the number of input terminals of the coupler, an Nx1 coupler may be made by the well-designed optical waveguide or the tree structure of the 2x1 coupler. Using the same principle, 1xN distributor for distributing the optical signal supplied to one optical waveguide to various optical waveguides may be made.

Figure 2:
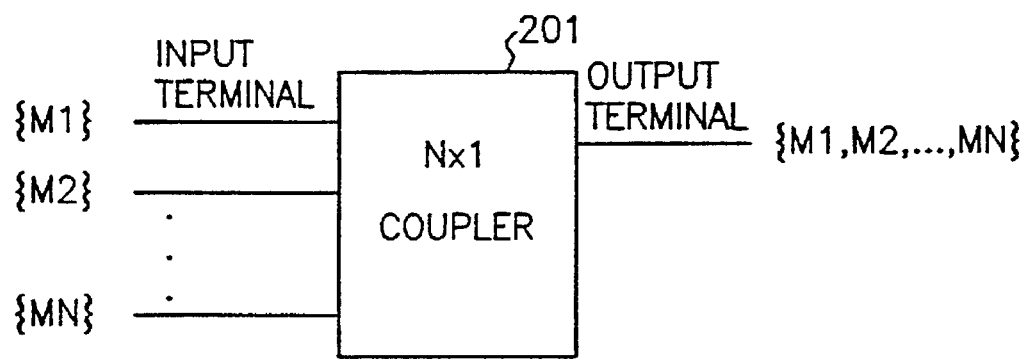
FIG. 2A is a block diagram of an Nx1 coupler according to the present invention.
FIG. 2B is a block diagram of a 1xN distributor according to the present invention.
Figure 2:
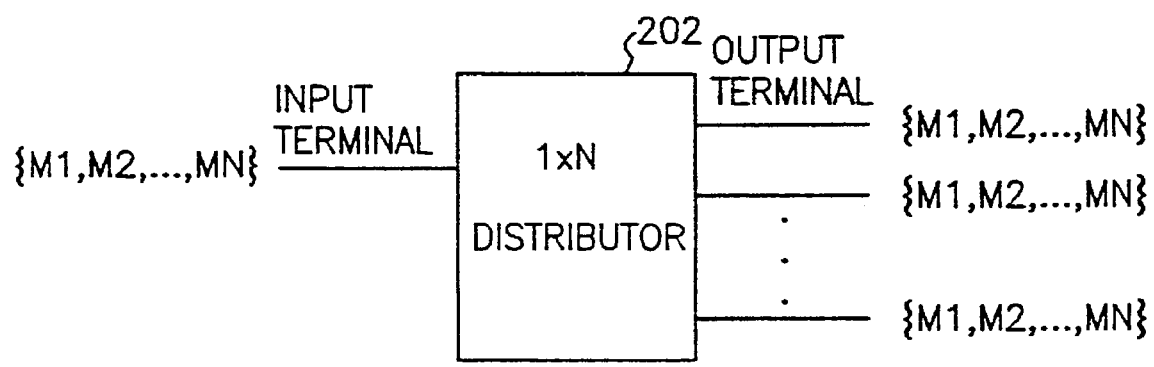

Referring to FIG. 2A, there is shown an Nx1 coupler 201. If the optical signals {M1}, {M2}, . . . , {MN} is supplied to N input terminals, a coupled optical signal {M1, M2, . . . , MN} is generated from one output terminal.

FIG. 2B illustrates a 1xN distributor 202. If an optical signal {M1, M2, . . . , MN} of N modes is supplied to one input terminal, the same optical signal {M1, M2, . . . , MN} is distributed to N output terminals.

If the specific structure of the optical waveguide varies, the mode selection as well as the coupling between modes is possible. For example, in the double mode optical fiber with the modes LP01 and LP11, only the mode LP01 can be passed by severely bending the optical fiber, and only the mode LP11 can be passed by connecting a different kind of the optical fiber. This mode selection is applicable to the multimode optical fiber.

Figure 3:
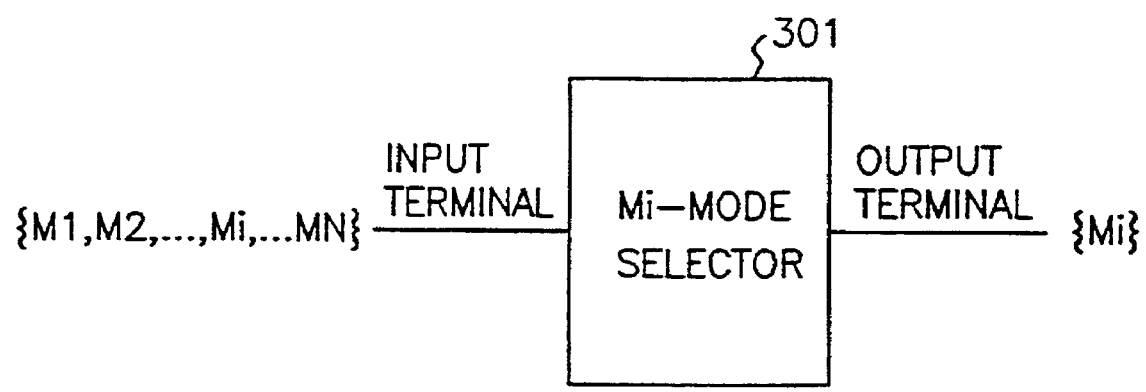
FIG. 3 is a block diagram of a mode selector according to the present invention.

FIG. 3 shows a mode selector 301. Only a designated select mode Mi is passed from the optical signal {M1, M2, . . . , Mi, . . . , MN} of various modes. of various modes.

Figure 4:
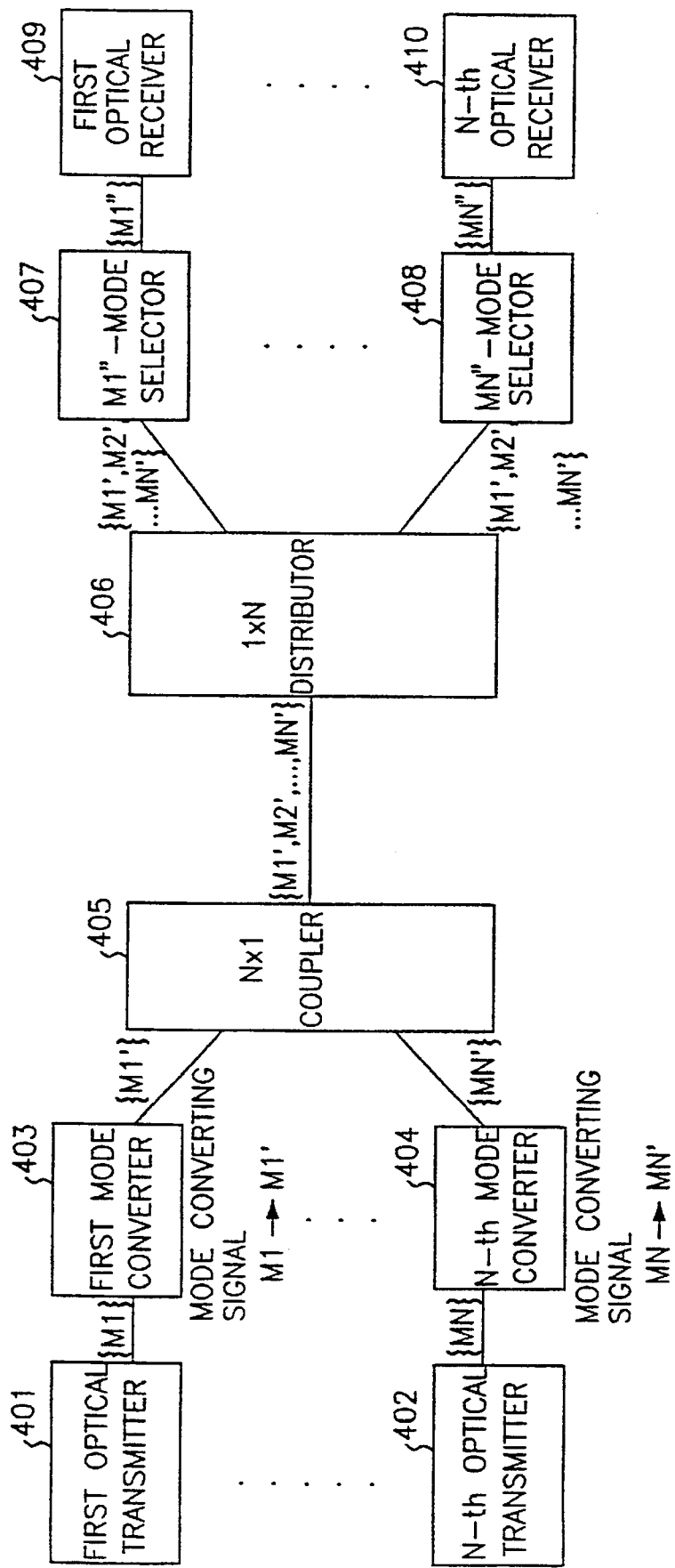
FIG. 4 is a block diagram of a unfolded NxN optical exchanging apparatus according to one embodiment of the present invention.

FIG. 4 shows one example of a unfolded NxN optical exchanging apparatus using mode conversion and mode selection. The unfolded NxN optical exchanging apparatus includes N optical transmitters 401–402 for generating optical signals each having a single constant mode, N mode converters 403–404 for converting the modes of the optical signals generated from the optical transmitters 401–402 by mode converting signals, an Nx1 coupler 405 for coupling N input optical signals to be generated to one terminal, a 1xN distributor 406 for distributing one optical signal generated from the Nx1 coupler 405 to N optical signals, N mode selectors 407–408 for respectively passing only the optical signal of a selected mode, and N optical receivers 409–410 for receiving the optical signals generated from the mode selectors 407–408.

Respective optical signals generated from the N optical transmitters 401–402 have respective single modes M1, M2, . . . , MN. The optical signals are supplied to the mode converters 403–404 connected to the optical transmitters 401–402. In the mode converters 403–404, the modes M1, M2, . . . , MN of the optical signals are converted to M1', M2', . . . , MN' by the mode converting signals. The mode-converted optical signals {M1'}, {M2'}, . . . , {MN'} are coupled to one optical signal {M1', M2', . . . , MN'} through the Nx1 coupler 405, distributed to N optical signals through the 1xN distributor 406, and then supplied to the N mode selectors 407–408. N respective mode selectors 407–408 pass only the optical signal of the selected mode. If the mode converted through the mode converters 403–404 is adjusted to have the same mode as the select mode of the mode selectors 407–408 before the optical receivers 409–410 to be connected, any optical transmitters 401–402 may be connected to any optical receivers 409–410. For example, in order to connect the first optical transmitter to the fourth optical receiver, and to connect the second optical transmitter to the first optical receiver, the mode M1' is set to M4", and the mode M2' is set to M1". Then the first optical transmitter is connected to the fourth optical receiver, and the second optical transmitter is connected to the first optical receiver.

Figure 5:
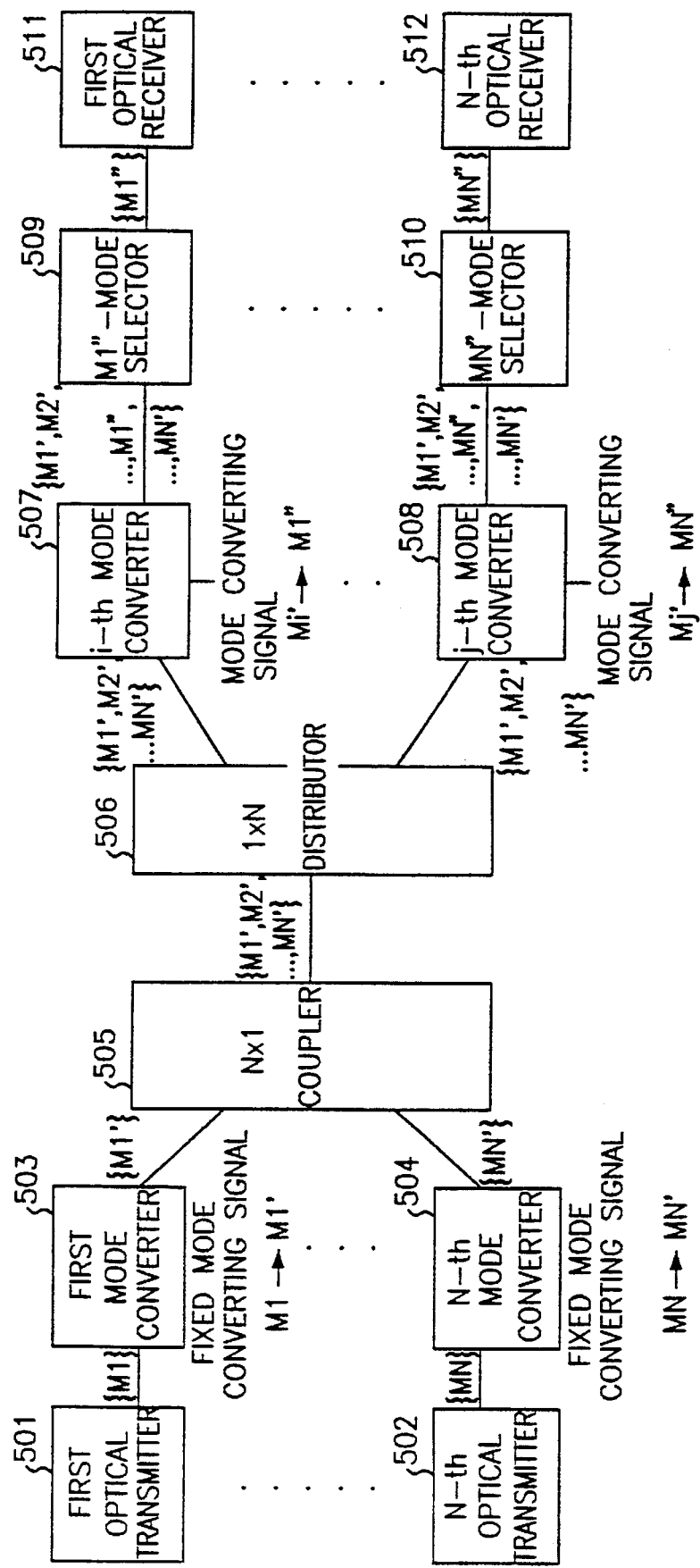
FIG. 5 is a block diagram of the unfolded NxN optical exchanging apparatus according to another embodiment of the present invention.

FIG. 5 shows another example of the unfolded NxN optical exchanging apparatus using mode conversion and mode selection. The unfolded NxN optical exchanging apparatus includes N optical transmitters 501–502 for generating optical signals each having a single constant mode, N mode converters 503–504 each having a fixed converting signal, an Nx1 coupler 505 for coupling N input optical signals to be generated to one terminal, a 1xN distributor 506 for distributing one input optical signal to N optical signals, another N mode converters 507–508 for converting the modes of the input optical signals according to mode-converting signals, N mode selectors 509–510 for respectively passing only the optical signal of a selected mode, and N optical receivers 511–512 for receiving the optical signals generated from the mode selectors 509–510.

Respective optical signals generated from the N optical transmitters 501–502 have respective single modes M1, M2, . . . , MN. The optical signals are supplied to the mode converters 503–504 connected to the optical transmitters 501–502. In the mode converters 503–504, the modes M1, M2, . . . , Mn of the optical signals are converted to M1', M2', . . . , Mn' by the fixed mode-converting signal. The mode-converted optical signals {M1'}, {M2'}, . . . , {MN'} are coupled to one optical signal {M1', M2', . . . , MN'} through the Nx1 coupler 505 and distributed to N optical signals each having various modes through the 1xN distributor 506. The N optical signals generated from the 1xN distributor 506 are sent to the N another mode converters 507–508 for converting the modes according to the mode converting signals. The converted mode is set to have the same mode as the select mode of the mode selectors 509–510. The N respective mode selectors 509–510 pass only the optical signal of the selected mode. Therefore, the mode-converted optical signals out of the optical signals {M1', M2', . . . , MN'}, . . . , {M1', M2', . . . , MN'} supplied to the mode converters 507–508 are supplied to the mode selectors 509–510, and the optical signals of the selected modes are supplied to the optical receivers 511–512.

Any optical transmitters 501–502 may be connected to any optical receivers 511–512 by adjusting the mode converting signals of the mode converters 507–508. For example, in order to connect the first optical transmitter to the fourth optical receiver, and to connect the second optical transmitter to the first optical receiver, the mode M1' is set to M4", and the mode M2' is set to M1". Then the first optical transmitter is connected to the fourth optical receiver, and the second optical transmitter 2 is connected to the first optical receiver.

As described above, the number of channels can be increased by the mode conversion capability and the mode select capability since the incoherence between optical modes is used. Moreover, although the inventive optical exchanging apparatus is similar to the optical wavelength multiplexing system, it has an advantages in that restrictions on the wavelength of the optical transmitter is small.

What is claimed is:

1. An optical exchanging apparatus comprising:

a plurality of optical transmitting means for generating optical signals each having a single constant mode;

a plurality of mode-converting means for converting modes of said optical signals generated from said optical transmitting means according to a mode-converting signal;

Nx1 coupling means for coupling the mode-converted optical signals generated from said mode-converting means to be supplied to one terminal;

1xN distributing means for distributing the coupled optical signal generated from said Nx1 coupling means to N optical signals each having various modes;

a plurality of mode-selecting means for respectively passing only the optical signal of a selected mode out of said N optical signals generated from said 1xN distributing means; and a plurality of optical receiving means for receiving the optical signals generated from said mode-selecting means.

2. An optical exchanging apparatus comprising:

a plurality of optical transmitting means for generating optical signals each having a single constant mode;

a first plurality of mode-converting means for converting modes of said optical signals generated from said optical transmitting means to fixed modes;

Nx1 coupling means for coupling the mode-converted optical signals generated from said mode-converting means to be supplied to one terminal;

1xN distributing means for distributing one coupled optical signal generated from said Nx1 coupling means to a plurality of optical signals;

a second plurality of mode-converting means for converting modes of the optical signals generated from said 1xN distributing means according to a mode-converting signal;

a plurality of mode-selecting means for respectively passing only the optical signal of a selected mode out of the mode-converted optical signals each having various modes generated from said second mode-converting means; and a plurality of optical receiving means for receiving the optical signals generated from said mode-selecting means.

* * * * *